United States Patent Office 2,905,961
Patented Sept. 29, 1959

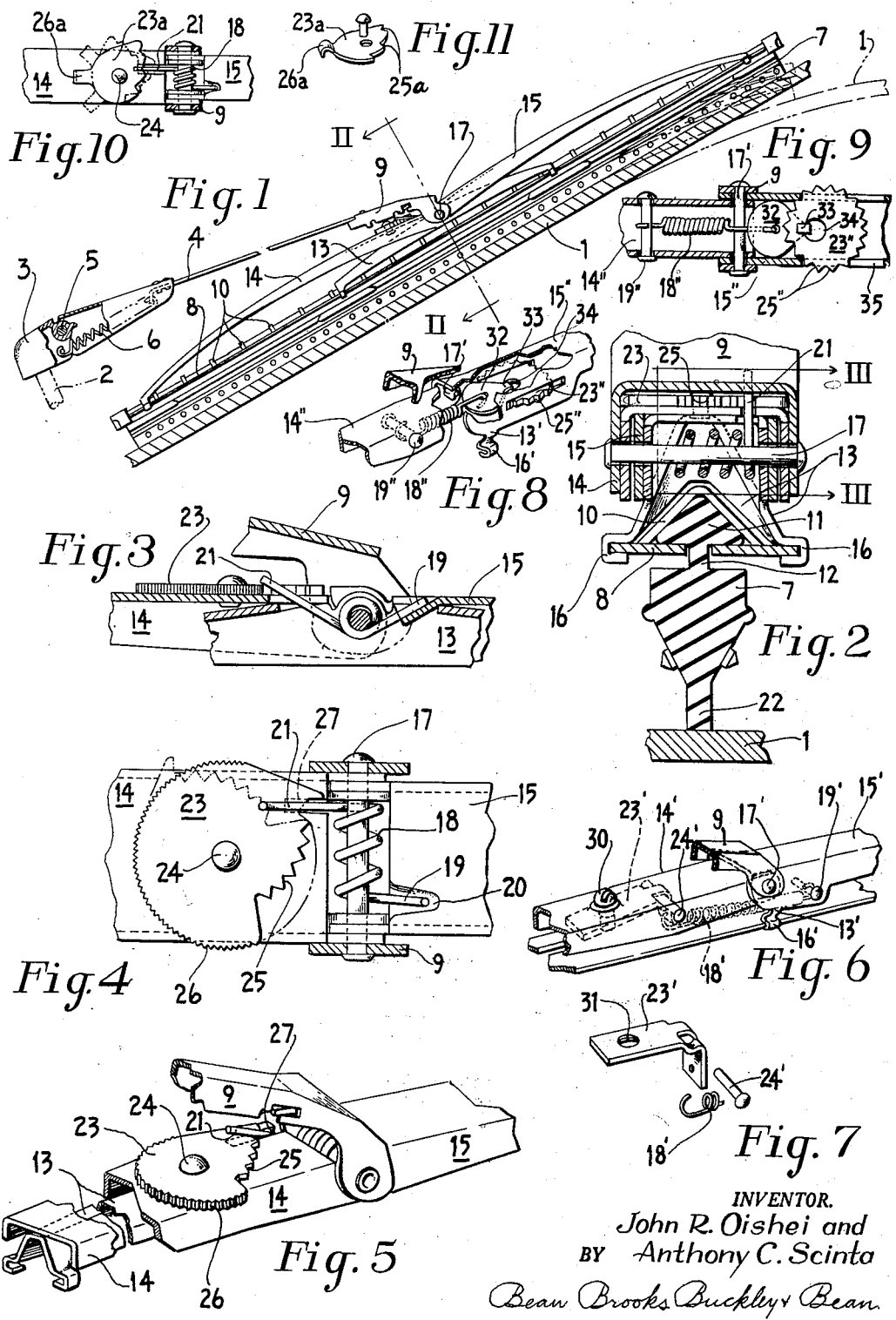

2,905,961
WINDSHIELD WIPER

John R. Oishei and Anthony C. Scinta, Buffalo, N.Y., assignors to Trico Products Corporation, Buffalo, N.Y.

Application December 5, 1955, Serial No. 550,982

10 Claims. (Cl. 15—245)

This invention relates to a windshield wiper structure for better curved glass blade pressure distribution, the same being an improvement on the earlier issued Patents No. 2,706,291 and 2,871,498.

An object of the invention is to provide means of selectively controlling the distribution of pressure as between the central portion and the end portions of a wiper blade for conforming to the curved windshield contour.

Another object of the invention is to provide a wiper in which the actuating arm pressure may be differentially applied along the wiping edge or lip and regulated in order to hold the wiping contact as the wiper is moved back and forth over the deeply curved modern windshield.

A further object of the invention is to provide a wiper design in which means are provided to counterbalancingly utilize three resilient elements of the mechanism, namely, a flat resilient backing spring of the blade unit, an interposed spring loaded superstructure for carrying the unit, and a spring loaded blade carrying arm, in combination with adjustment means by which the interposed superstructure may regulate the spring pressure to increase or lessen its spring loading to compensate for the differences in the pressure requirements to conform the spring backing to the glass contour under the urge of the spring-loaded arm.

Another object of the invention is to provide for more efficient distribution of pressures and more efficient utilization of pressures, to thus enable the blade to be driven with less power, moving laterally more easily, and making the wiper system more efficient.

Again, an object of the invention is to overcome the drawbacks present in the normal curved glass wiper equipment where now conditions exist in which too much pressure is applied in some places and not enough pressure in other places, whereby the efficiency of the wiper system is adversely affected.

In the accomplishment of the purposes of the invention, a selector means of varying the pressure, derived from the interposed spring loaded lever action, is employed. The adjustment mechanism is illustrated with the torsion spring loading a pair of pressure applying levers that pivotally mount on a common center with a centrally positioned yoke. The movement of the selector means will increase or decrease the torsion winding of the spring element by means of which the available arm pressure, applied through a transversely extending pivot coupling, may be divided to subtract from the arm pressure the influence on the yoke and direct more pressure from the arm to the outwardly extending portions of the blade. Conversely, the adjustment may be made to reverse the directed pressures to lessen the bearing force outwardly of the center, to permit the greater pressure application centrally of the blade.

In other words, the control mechanism represents a means of increasing or decreasing pressure in the center in relation to the pressure on the ends whereby, for the procurement of the best wipe, the most desirable distribution of blade pressure may be obtained by the pressure shifting means.

Likewise the mechanism affords a desirable choice of blade distribution pressure to make the blade interchangeably usable on vehicles in service, in which a variation of as much as twenty-five percent in built-in spring loading in arms has been adopted in connection with the variety of contours of the curved glass used in differing car models. The universally usable replacement blade is here made available to meet the differing conditions of design in spring loading of wiper carrying arms, giving the blade a wide variety of usage to better fit the needs of servicing the vehicles in the field of various makes and varying year models.

The broad field of use for the purposes cited has been found to exist, which is fully met in the instant invention by making available in the single model blade the replacement for worn out blades of earlier types without the use of counterbalancingly loading in the blades, namely, blades of the lever type in which, for pressure distribution, reliance has been placed upon the length and position of the levers only. These lever types, without an incorporated spring adjustment, have in all instances relied upon the centrally positioned transverse pivot connection to the spring-loaded arm. In such instances, the surface conforming spring backing for the rubber element has been made to respond only to the arm pressure spring influence without any preflexing of the backing.

Where replacement for such blades is made by blades incorporating the instant invention, the service station operator is enabled, while attaching the blade, to merely turn the spring loaded selector control to obtain substantially the same overall result with lighter arm pressure as far as the centralized portion of the blade is concerned.

The result of incorporating the adjustable spring-loaded distribution in the blade structure will greatly simplify the servicing of cars in the field, safeguarding the public in making available in more places the quickly installable blade replacements to meet a variety of needs, both as to initial blade structures representing the original equipment of the vehicle and the wide variety of contours in the various styling of curved glass windshields appearing on various makes and models of motor cars.

A further aim of the invention is to provide a wiper of this character in which its auxiliary spring may be adjusted with respect to the actuating arm pressure for securing a cooperative balance between the two springs to obtain uniform contact throughout the length of the blade with the curved surface contour of modern day windshields.

The foregoing and other objects will manifest themselves as this description progresses, reference being had to the accompanying drawing, wherein Fig. 1 is a side elevation showing the improved wiper mounted upon the curved windshield;

Fig. 2 is a transverse sectional view about on line II—II of Fig. 1;

Fig. 3 is an enlarged fragmentary sectional view with portions left in elevation;

Fig. 4 is a fragmentary plan view of the blade with portions in section;

Fig. 5 is a perspective view more clearly showing the invention;

Fig. 6 is a fragmentary perspective view of a modified embodiment;

Fig. 7 is an exploded detail view of a part thereof;

Fig. 8 is a fragmentary perspective view of a further embodiment with portions broken away for clarity;

Fig. 9 is a horizontal sectional view through the disclosure made in Fig. 8;

Fig. 10 is another modification closely allied to the embodiment of Figs. 1–5; and Fig. 11 is a detailed exploded perspective view of a part thereof.

Referring more particularly to the drawing, the numeral 1 designates the windshield of an automobile, 2 the oscillatory wiper shaft journaled at the lower side thereof and on which the wiper actuating arm is fixed. This arm embodies a mounting section or head 3 and a wiper carrying section 4 pivoted thereon by a pin 5 and biased by a spring 6 to press a carried wiper against the windshield.

The wiper comprises a blade unit, having a flexible blade 7 backed by a surface conforming backing 8, and a supporting superstructure to which the outer end of the arm is connected by a mounting coupler 9. The backing is in the form of a strip having side rails spaced apart by arched cross straps 10 to receive the anchoring bead 11 from which the blade body is suspended by a neck 12. The superstructure comprises a pressure equalizing and unit supporting yoke 13 and two unit supporting levers 14 and 15 which overhang the yoke and bear upon the backing 8 adjacent each end. The opposite ends of the yoke likewise bear upon the backing but medially thereof. Each bearing is effected by a pair of claws 16 that have sliding engagement with the side rails. The inner or adjacent ends of the levers are joined by a pivot pin 17 on which the medial yoke is als pivotally suspended and the mounting coupler 9 is secured, as by peening over the extremities of the pivot pin. A torsion spring 18 is coiled about the pin and has its opposite ends engaged respectively on the hingedly connected levers 14, 15. The end 19 engages in a depression or seat 20 formed in the lever 15 while the opposite end 21 exerts downward pressure on lever 14.

In practice, the spring 18 exerts a downward force upon the outer ends of the levers and reacts at the hinge joint to exert a lifting force upon the medial portion of the blade unit. This lifting tendency is counteracted and overcome by the dominating force of the arm spring 6 which is distributed in a prescribed manner through the claws 16 to the surface conforming backing to impose the required wiping pressure on the lip 22. However, should this balance be disturbed, as by mounting the wiper on an arm the spring of which latter is weaker either by design or from wear and tear, the lifting tendency of the spring hinge will be more pronounced and more responsive to strong wind currents, with the result that the wiping lip will lift off the glass and mar the line of sight with vision blurring streaks. A new balanced relation between the springs 6 and 18 must be established for satisfactory and effective wiper performance.

In accordance with the present invention, a wiper is provided with an adjustment factor that will enable the motorist, or the service station attendant, to readily establish the desired balanced relation between the arm spring and the wiper spring. To this end, an adjustable spring is incorporated in the wiper unit itself. In the embodiment depicted in Figs. 1 through 5, there is provided a thumb adjustment in the form of a disk-shaped lever 23 pivoted at 24 on the lever 14 and having a stepped series of seats 25 for selectively receiving the spring terminal 21. The series of seats extends about the pivot 24 on an eccentric arc so that the successive seats will serve to support the spring terminal 21 at different elevations and thereby function to increase or decrease the spring tension accordingly. The seats 25 are cam-like in shape to ease the spring terminal out of one seat and into the next. The peripheral back edge of the disk overhangs the side of the lever 14 and may be knurled at 26 for thumb traction. Or, the knurling 26 may be replaced by a handle 26a, as shown in Fig. 11, wherein the lever 23a is pivoted at 24 and is formed with a lesser number of seats 25a for according larger increments of spring adjustment. In either form the spring terminal 21 is accorded lateral support by the side walls of a slot 27 formed in the underlying lever 14.

Figs. 6 and 7 show a further modification in which the levers 14' and 15' are hingedly connected at 17' and mutually acted upon by a tension spring 18' which has one end anchored to the lever 15' by a pin 19' and its opposite end adjustably anchored on the companion lever 14' by an anchor member 23', the latter being in the form of a bellcrank lever that is pivoted on a pin 24' for adjustment by a screw 30 which has journal support in the lever 14' and threaded engagement in an opening 31 in the bellcrank. The medial supports 13' are formed integral with the channeled sides of the lever 15' and is provided with claws 16' for slidably supporting the side rails 8 of the blade backing.

By adjusting the screw 30, the spring 18', which lies across the hinge joint 17' is distended or contracted longitudinally in accordance with the direction of turn given the screw to modify the arm applied pressure as transmitted to the wiping lip 22 on the glass surface.

In the modification depicted in Figs. 8 and 9, the superstructure levers 14" and 15" are hinged together by a pin 17'. A tension spring 18" is anchored by a pin 19" at one end and by a connector plate 32 engaging its hook 33 in an eccentric opening 34 provided in the adjustment lever or disk 23", the latter being given floating support within slots 35 formed in the side flanges of the channel lever 15". The periphery of the disk is formed with a series of seats 25" for engaging in the adjacent end walls of the slots 35 under the urge of the spring 18", and when adjustment is desired the oppositely projecting peripheral portions of the disk are engaged between the thumb and forefinger and bodily withdrawn against the spring tension, then roated, and finally released to present another selected pair of the seats 25" to the end walls of the slots 35. This adjustment serves to rotate the eccentric opening 34 to vary the tension on the spring 18" in modifying the arm applied pressure on the wiping lip. The lever 15" has the medial supports 13' with its claws 16' for slidably supporting the blade unit 7, 8.

For the more deeply curved windshield contours, the hingedly connected levers 14 and 15 may be correspondingly curved for proper clearance. In cross section they may be U-shaped and the nesting arms of the yoke 13 may be of inverted V-shape in cross section, as depicted in Fig. 5 to wedge outwardly any packing snow which may collect and tend to hamper the full nesting action of the parts.

The arm spring 6 dominates the superstructure spring 18 to which it is connected through the single coupler 9 and thereafter modified to distribute the arm applied pressure more or less uniformly to the spring backing 8. Should any portion of the wiping lip fail to contact the windshield glass, such as the outer end portion, the superstructure spring is adjusted to exert greater pressure at the outer ends of the hingedly connected levers. This will have the effect of exerting a relatively lighter pressure beneath the spring hinge.

Under certain weather conditions it may be advisable to apply a heavier pressure medially of the blade, or underneath the spring hinge, even to the extent of shortening the effective length of the blade unit to that spanned by the yoke 13, in which event the spring hinge 18 will be adjusted to lighten its downward urge and give way largely to the arm spring.

It is thereby apparent that the spring loaded superstructure may be regulated to variably distribute the arm applied pressure to cause the wiping lip to properly wipe the irregular contour of the modern panoramic or deeply curved windshield. The wiper may be tension-fitted to its actuating arm to balance the arm pressure in accordance with the individual needs of different blade portions throughout the length of the blade unit.

The foregoing description has been given in detail for clarity and without thought of limitation since the inventive principles involved are capable of assuming other physical embodiments without departing from the spirit of the invention and the scope of the appended claims.

What is claimed is:

1. A windshield wiper comprising a blade unit having a flexible backing, a flexible superstructure connectible to a pressure applying wiper actuating arm and having unit supporting arms joined at their inner ends by a spring hinge and having their outer ends operatively connected to the blade unit at longitudinally spaced areas, a pressure applying connection between the spring hinge and the blade unit intermediate said areas providing medial support for the blade unit, and pressure controlling means operable to adjust the tension of the spring hinge for regulating the arm applied pressure in such spaced areas relative to that applied through said intermediate connection.

2. A windshield wiper comprising a blade unit having a flexible backing, a flexible superstructure connectible to a pressure applying wiper actuating arm and having unit supporting arms joined at their inner ends by a spring hinge and having their outer ends operatively connected to the blade unit at longitudinally spaced areas, a rigid pressure applying yoke pivotally suspended by the spring hinge and bearing at its opposite ends on the blade unit intermediate said areas for providing a pressure equalized medial support for the blade unit, and pressure controlling means operable to adjust the tension of the spring hinge for regulating the arm applied pressure in such spaced areas relative to that applied through said yoke.

3. A curved windshield wiper comprising a blade unit having a flexible surface-conforming backing and a superstructure having oppositely extending unit-supporting arms joined at their inner ends by a spring hinge and having their outer ends slidably embracing the opposite ends of the blade unit, a pressure-equalizing yoke suspended from the spring hinge and having oppositely extending rigidly-related arms underlying the first arms and slidably embracing the flexible backing to give medial support to the blade unit, means operable to vary the tension in the spring hinge to raise and lower the spring hinge and its suspended yoke for regulating the pressure in the several contacts of the yoke ends and the arm ends upon the blade unit, and means for attaching the superstructure to an actuating spring arm.

4. A windshield clearer comprising a blade unit having a flexible wiping body with a surface-conforming backing, an arm-pressure distributing superstructure having a pair of oppositely extending pressure applying levers connected at their inner ends by a pivot member and at their outer ends by slidable connections to the blade unit, a secondary pressure applying lever suspended freely from the pivot member, spring means acting on the pair of levers to depress their outer ends and tending to react toward lifting their inner ends with the suspended secondary lever, means for attaching the superstructure to an actuating spring arm, and a wiping pressure regulating member acting on and through the spring means to adjust the secondary lever relative to the pressure applying outer ends of the pair of levers to hold the blade unit in wiping contact throughout its length.

5. A windshield wiper comprising a blade unit having a flexible backing, and a flexible superstructure having a pair of unit supporting levers joined end-to-end by a spring hinge and having their opposite ends bearing downwardly upon the flexible backing at spaced points, a rigid pressure equalizing yoke pivotally suspended from the hinge and connected to and bearing downwardly upon the flexible backing at spaced points between the first spaced points to provide medial support for the blade unit, said levers being of inverted channel shape and said yoke having arms of an inverted V-shape in section and nesting into the channeled levers, and means on the superstructure for coupling to an actuating arm.

6. A windshield wiper comprising a blade unit having a flexible backing, and a flexible superstructure having a pair of unit supporting levers joined end-to-end by a spring hinge and having their opposite ends bearing downwardly upon the flexible backing at spaced points, a rigid pressure equalizing yoke pivotally suspended from the hinge and connected to and bearing downwardly upon the flexible backing at spaced points between the first spaced points to provide medial support for the blade unit, and means on the superstructure for coupling to an actuating arm.

7. A wiper for curved windshields, comprising a blade unit having a flexible backing and a flexible superstructure having unit supporting arms joined by a spring hinge to provide oppositely extending resilient terminal supports for the opposite ends of the blade unit, a medial support for the blade unit carried by the spring hinge between the terminal supports, tension regulating means acting to regulate the hinge spring and thereby to modify the arm applied pressure on the medial support relative to that applied to the terminal supports.

8. A wiper for curved windshields, comprising a blade unit having a flexible blade body with a wiping edge along one longitudinal margin and a surface-conforming backing supporting its opposite margin, a superstructure having a pair of levers joined together in end-to-end relation by a spring hinge, the outer ends of the levers supporting the blade unit at longitudinally spaced points and acting under the spring urge to depress the blade unit at such points while imposing a lifting urge on the hinge, an intermediate support carried by the hinge and supporting the blade unit at a point between the aforesaid spaced points, mounting means for attaching the superstructure to a pressure applying actuating arm, and tension regulating means carried by the superstructure and acting on the hinge spring to adjust its pressure on the spaced points relative to the arm applied pressure on the intermediate support.

9. A windshield wiper comprising a blade unit having a resilient backing strip, a spring loaded flexible superstructure connectible to a pressure applying wiper actuating arm and including unit supporting arms joined at their inner ends by a spring hinge and having their outer ends operatively connected to the blade unit at longitudinally spaced areas, pressure applying claws carried by the superstructure adjacent the spring hinge and straddling the backing strip intermediate said areas for providing intermediate support for the blade unit, and pressure controlling means operable to adjust the spring imposed load of the hinge spring for modifying the arm applied pressure in such spaced areas relative to that applied through such intermediate connection.

10. A windshield wiper comprising a blade unit having a flexible backing, a flexible superstructure connectible to a pressure applying wiper actuating arm and having unit supporting arms joined at their inner ends by a spring hinge and having their outer ends operatively connected to the blade unit at longitudinally spaced areas for acting downwardly in such areas and reacting upwardly on the spring hinge, a pressure applying connection between the spring hinge and the blade unit intermediate said areas providing medial support for the blade unit, and pressure controlling means operable to vary the action and reaction of the hinge spring to modify the arm applied pressure as distributed to such spaced areas relative to that applied through said intermediate connection.

References Cited in the file of this patent

UNITED STATES PATENTS

| 2,702,397 | Oishei | Feb. 22, 1955 |
| 2,752,626 | Oishei | July 3, 1956 |

FOREIGN PATENTS

| 1,033,521 | France | Apr. 1, 1953 |
| 1,062,783 | France | Dec. 9, 1953 |